United States Patent
Caruso et al.

(10) Patent No.: US 10,113,531 B2
(45) Date of Patent: Oct. 30, 2018

(54) METHODS FOR REPAIRING WIND TURBINE ROTOR BLADES

(71) Applicant: General Electric Company, Schenectady, NY (US)

(72) Inventors: Christopher Daniel Caruso, Greenville, SC (US); Aaron A. Yarbrough, Greenville, SC (US); Daniel Alan Hynum, Simpsonville, SC (US); James Robert Tobin, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 402 days.

(21) Appl. No.: 14/835,998

(22) Filed: Aug. 26, 2015

(65) Prior Publication Data

US 2017/0058860 A1     Mar. 2, 2017

(51) Int. Cl.
    *F03D 1/06*     (2006.01)
    *F03D 80/50*     (2016.01)

(52) U.S. Cl.
    CPC ........... *F03D 1/0675* (2013.01); *F03D 80/50* (2016.05); *F05B 2230/80* (2013.01); *Y02E 10/721* (2013.01); *Y02P 70/523* (2015.11)

(58) Field of Classification Search
CPC ..... F03D 1/0675; F03D 80/50; F05B 2230/80
See application file for complete search history.

(56) References Cited

U.S. PATENT DOCUMENTS

| | | | |
|---|---|---|---|
| 6,264,877 | B1 | 7/2001 | Pallu De La Barriere |
| 8,317,479 | B2 | 11/2012 | Vronsky et al. |
| 8,657,581 | B2 | 2/2014 | Pilpel et al. |
| 8,673,106 | B1 | 3/2014 | Jolley et al. |
| 8,747,098 | B1 | 6/2014 | Johnson et al. |
| 8,961,142 | B2 | 2/2015 | Wansink |
| 8,992,813 | B2 | 3/2015 | Robbins et al. |

(Continued)

FOREIGN PATENT DOCUMENTS

| | | |
|---|---|---|
| CN | 101906251 | 8/2010 |
| JP | 2007-92716 | 4/2007 |

(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.

(Continued)

*Primary Examiner* — Moshe Wilensky
(74) *Attorney, Agent, or Firm* — Dority & Manning, P.A.

(57) ABSTRACT

The present disclosure is directed a method for repairing a rotor blade of a wind turbine. More specifically, in certain embodiments, the rotor blade may be constructed, at least in part, of a thermoplastic material reinforced with at least one fiber material. Thus, the method includes identifying at least one defect on the rotor blade. For example, in certain embodiments, the defect(s) as described herein may include a crack, creep, void, hole, distortion, deformation, scratch, or any other blade defect. The method also includes applying at least one of heat, pressure, and/or one or more chemicals to the defect(s) for a predetermined time period until the defect is repaired.

11 Claims, 10 Drawing Sheets

(56) References Cited

U.S. PATENT DOCUMENTS

| | | | |
|---|---|---|---|
| 2006/0277753 A1* | 12/2006 | Ntsama-Etoundi | B23P 6/005 29/889.1 |
| 2009/0148300 A1 | 6/2009 | Driver et al. | |
| 2011/0097211 A1 | 4/2011 | Rudling | |
| 2011/0167633 A1* | 7/2011 | Anasis | B23P 6/002 29/889.1 |
| 2012/0267347 A1* | 10/2012 | Arjakine | B05B 7/228 219/121.64 |
| 2013/0164133 A1 | 6/2013 | Grove-Nielsen | |
| 2014/0295187 A1 | 10/2014 | Jacobsen et al. | |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

OTHER PUBLICATIONS

Teuwen, et al.; "Vacuum Infused Thermoplastic Composites for Wind Turbine Blades," 2008 Wind Turbine Blade Workshop, Sandia National Laboratories—Presentation—May 12-14, 2008; (22 pages).

* cited by examiner

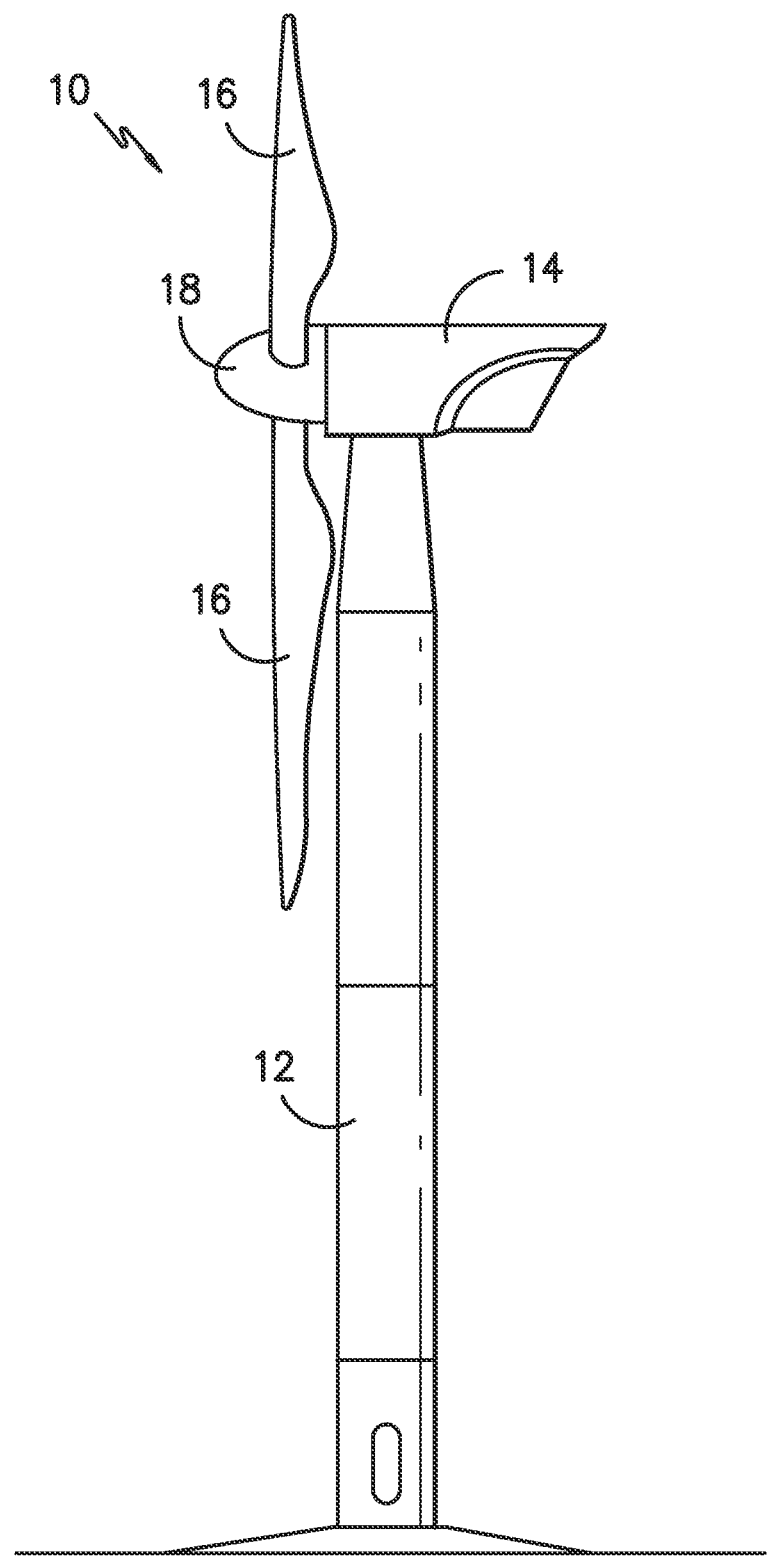
FIG. -1-

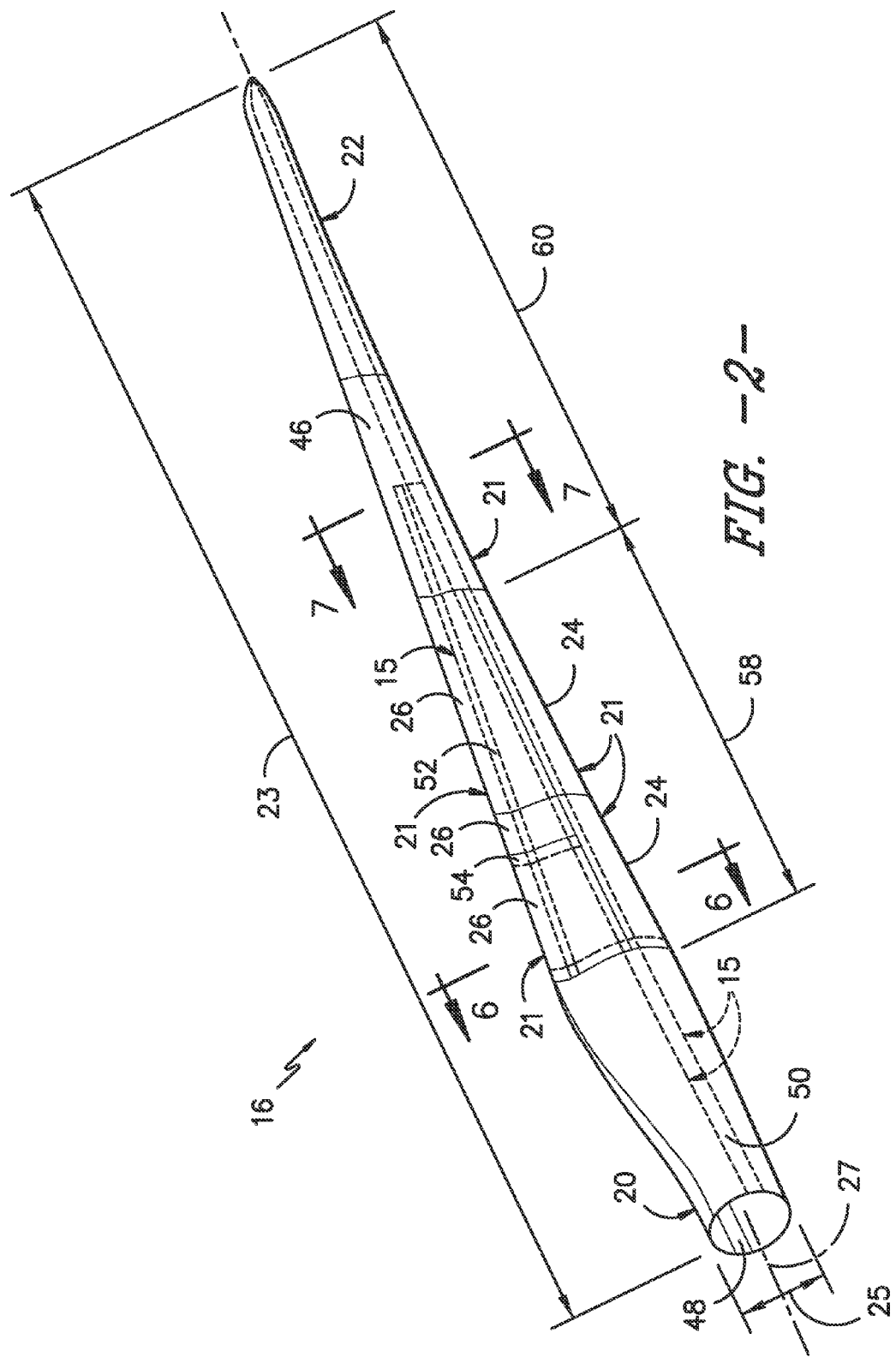

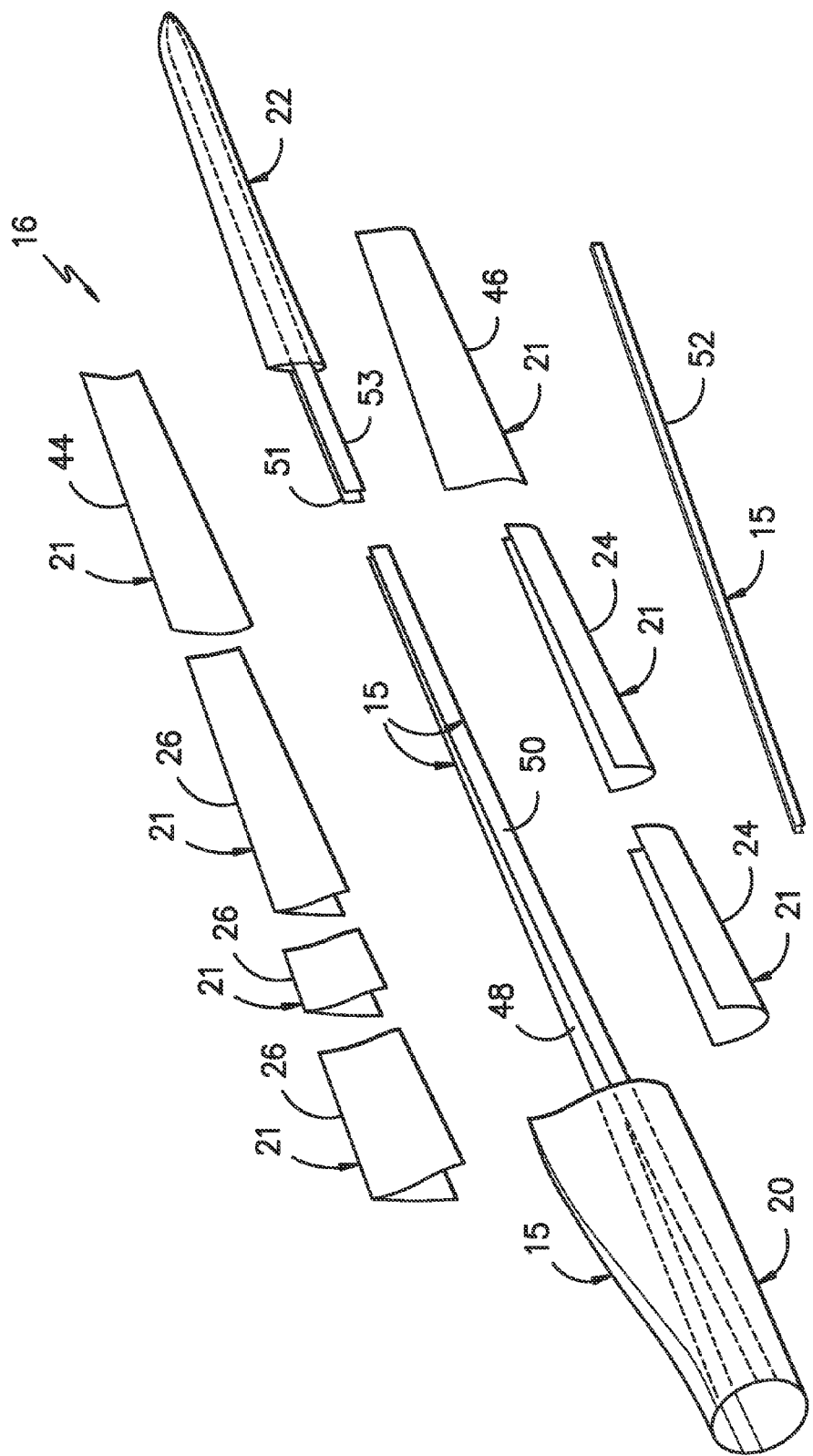
FIG. -3-

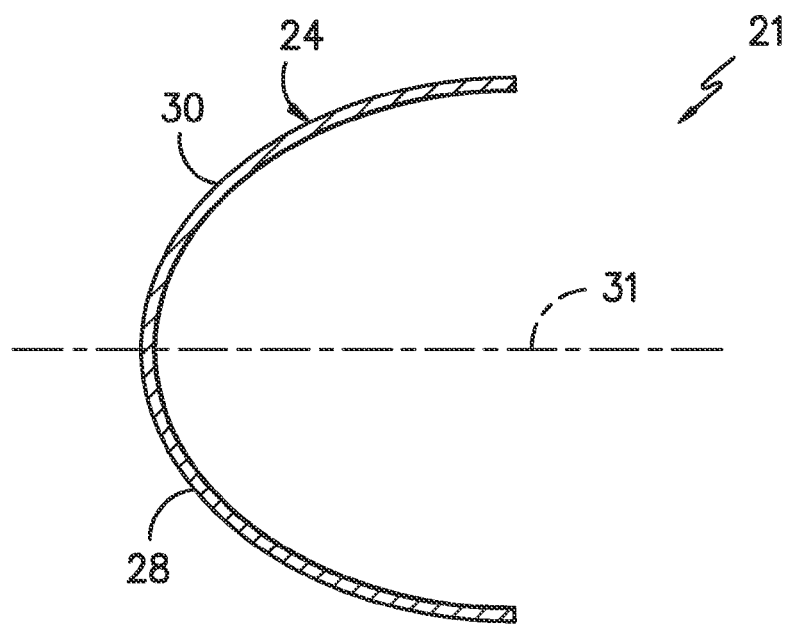
FIG. -4-
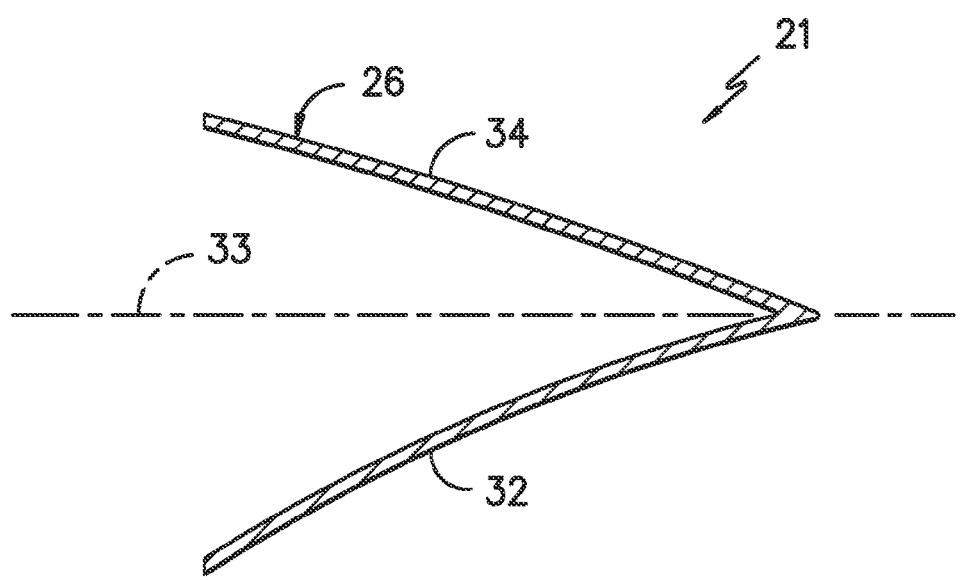
FIG. -5-

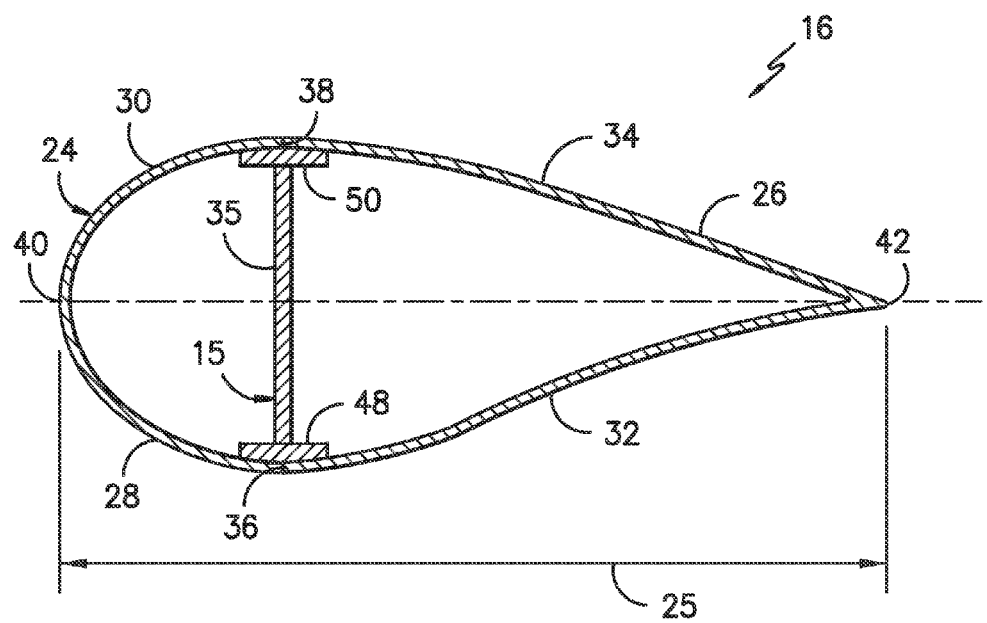
FIG. -6-
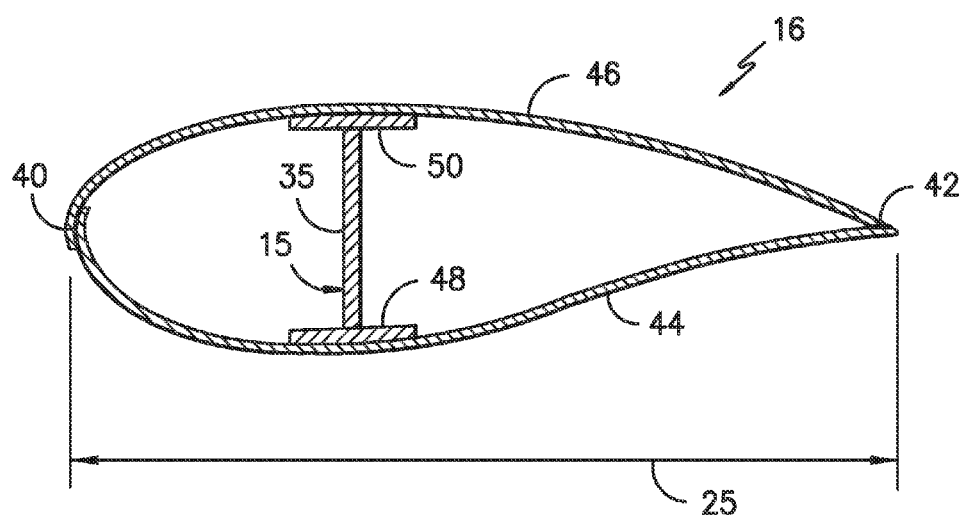
FIG. -7-

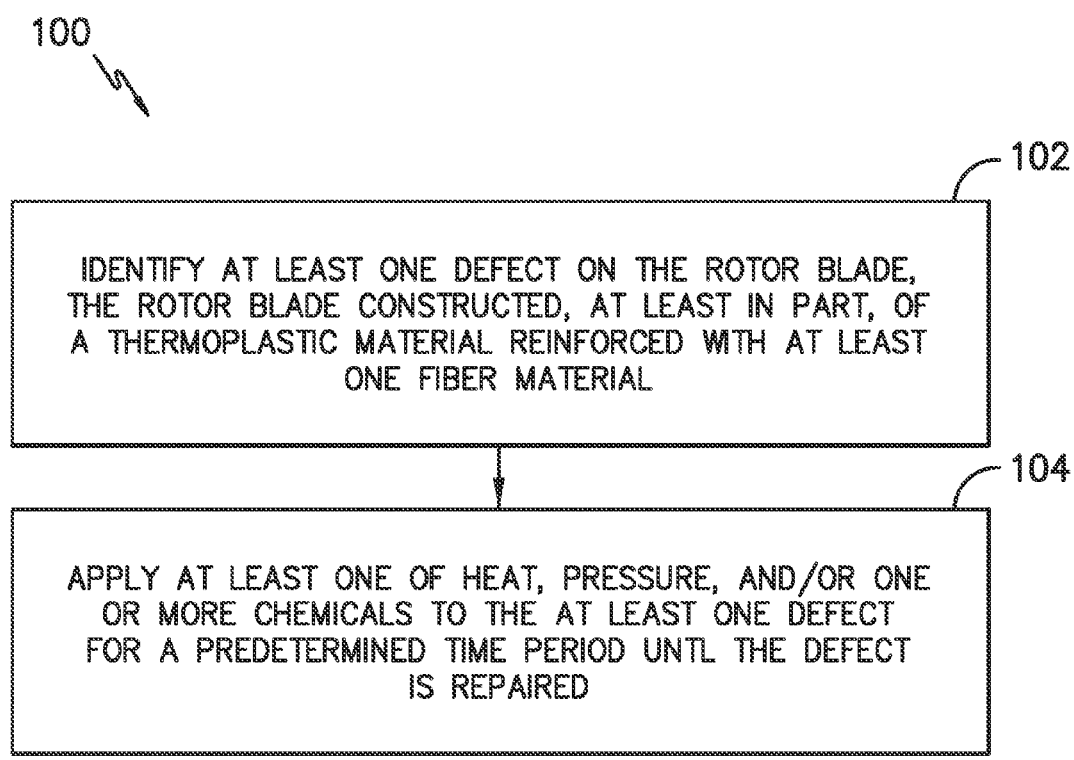
FIG. -8-

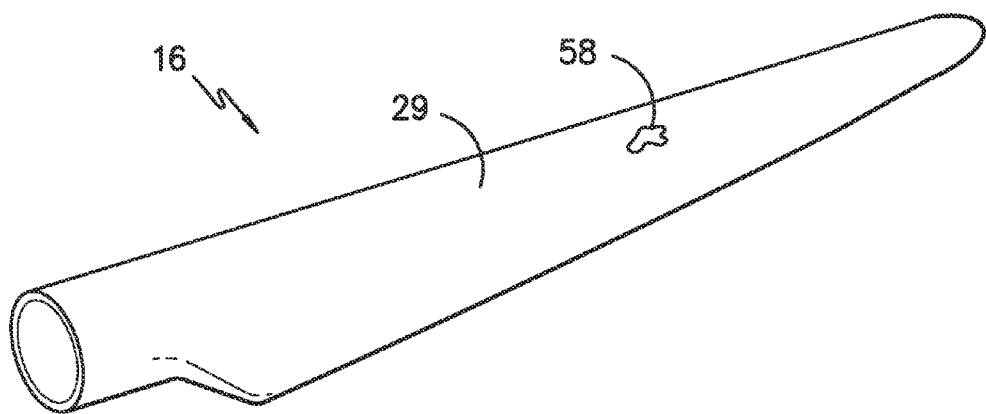
FIG. -9-
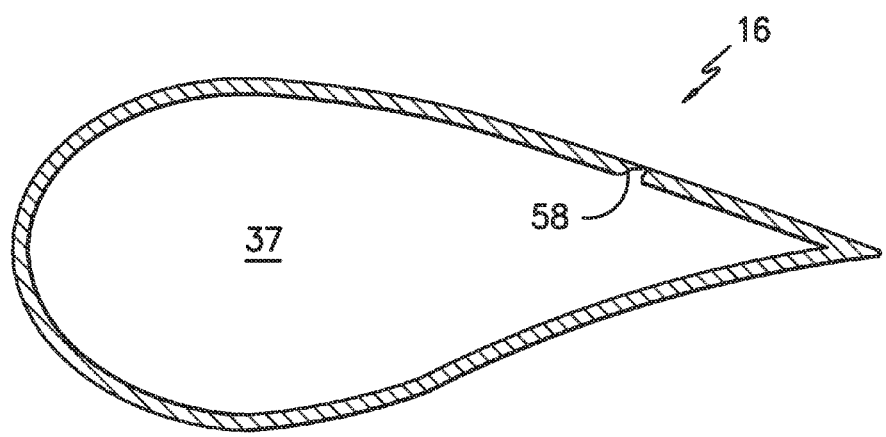
FIG. -10-

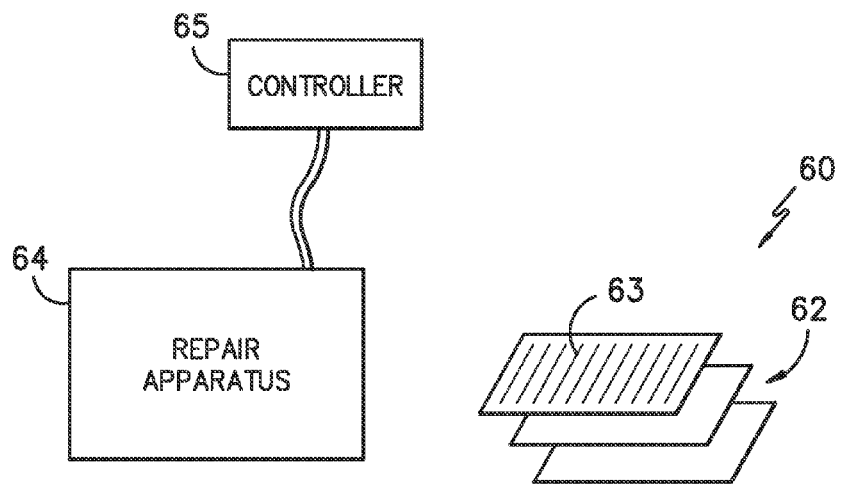
FIG. -11-
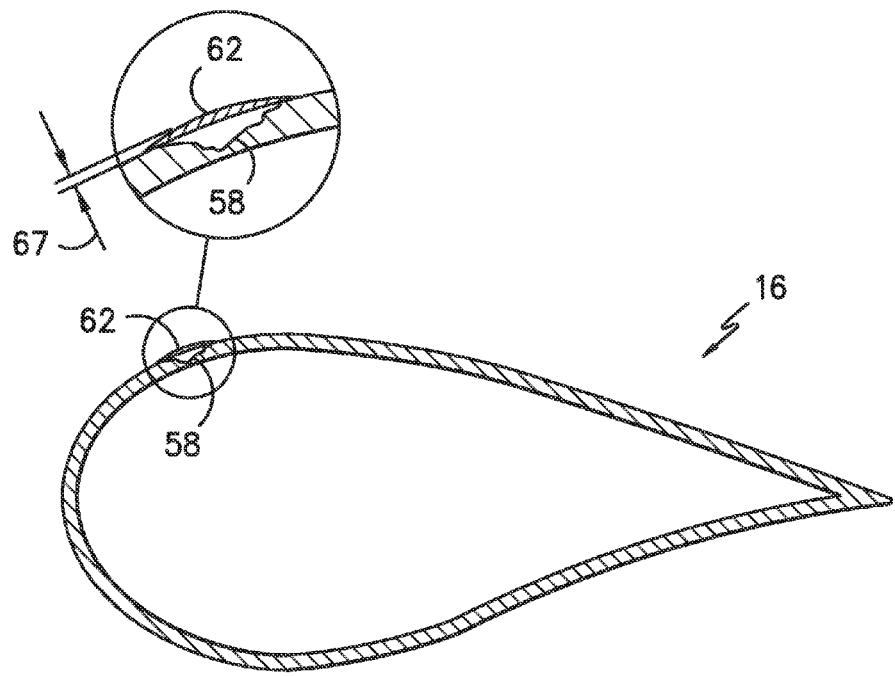
FIG. -12-

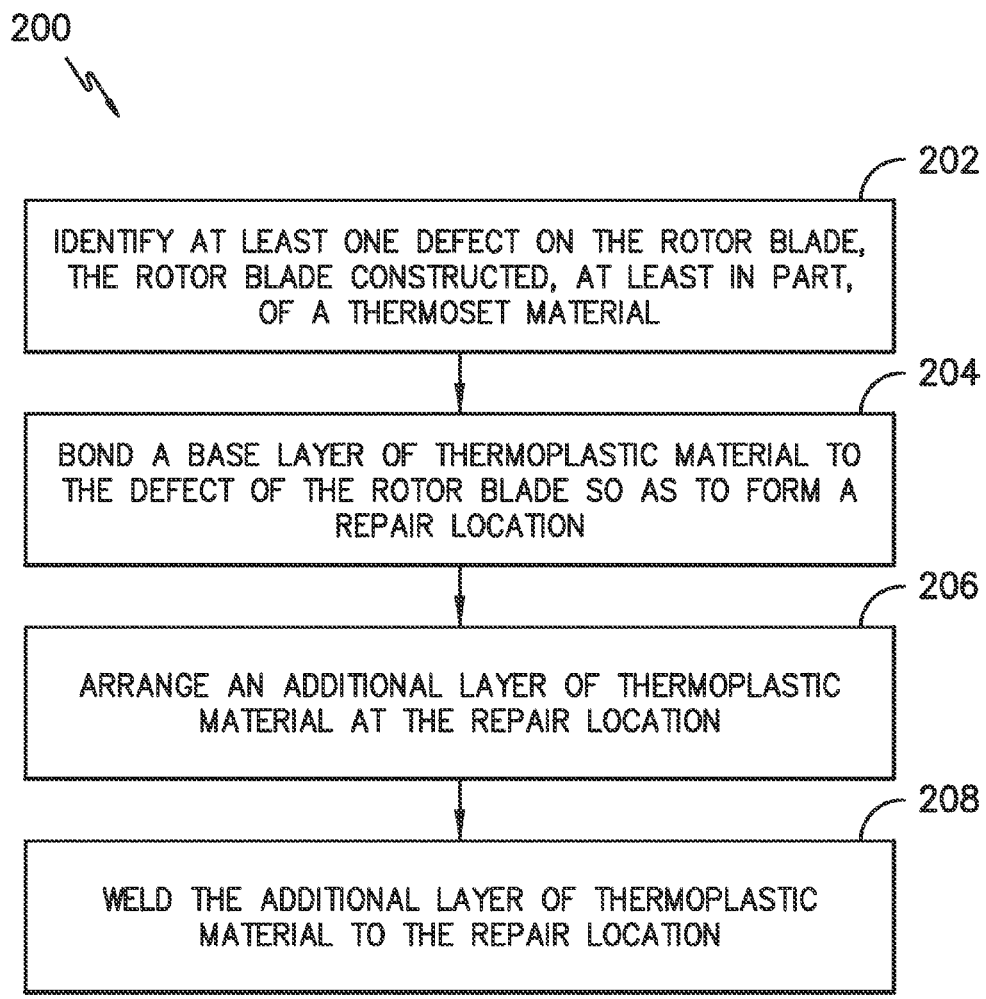
FIG. -13-

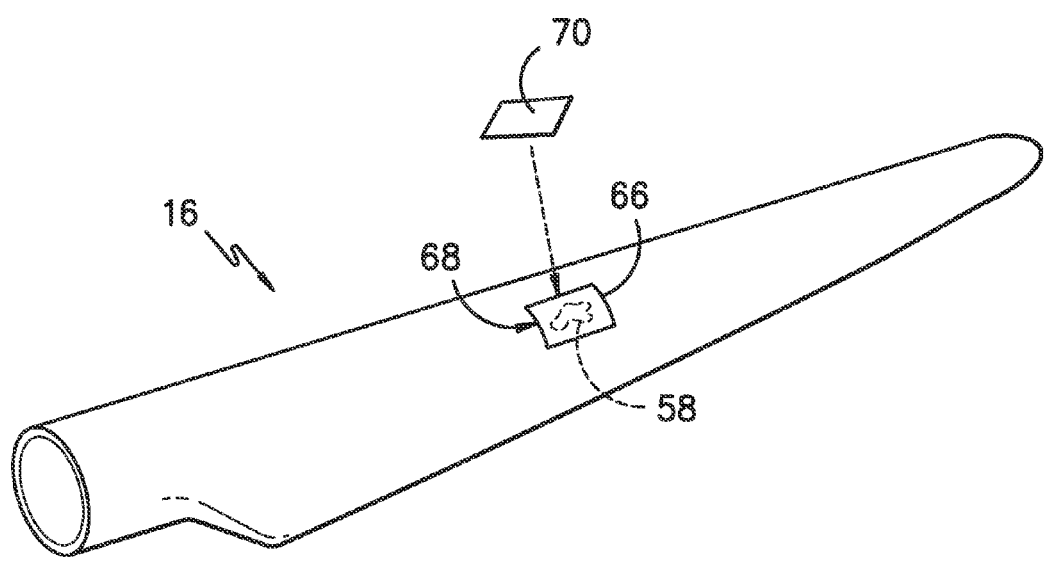
FIG. -14-

METHODS FOR REPAIRING WIND TURBINE ROTOR BLADES

FIELD OF THE INVENTION

The present disclosure relates generally to wind turbine rotor blades, and more particularly to methods for repairing wind turbine rotor blades having one or more defects from manufacturing and/or operation.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The rotor blades generally include a suction side shell and a pressure side shell typically formed using molding processes that are bonded together at bond lines along the leading and trailing edges of the blade. Further, the pressure and suction shells are relatively lightweight and have structural properties (e.g., stiffness, buckling resistance and strength) which are not configured to withstand the bending moments and other loads exerted on the rotor blade during operation. Thus, to increase the stiffness, buckling resistance and strength of the rotor blade, the body shell is typically reinforced using one or more structural components (e.g. opposing spar caps with a shear web configured therebetween) that engage the inner pressure and suction side surfaces of the shell halves. The spar caps are typically constructed of various materials, including but not limited to glass fiber laminate composites and/or carbon fiber laminate composites. The shell of the rotor blade is generally built around the spar caps of the blade by stacking layers of fiber fabrics in a shell mold. The layers are then typically infused together, e.g. with a thermoset resin. In addition, methods for manufacturing wind turbine rotor blades may include forming the rotor blades in blade segments. The blade segments may then be assembled to form the rotor blade.

For example, some modern rotor blades, such as those blades described in U.S. patent application Ser. No. 14/753, 137 filed Jun. 29, 2105 and entitled "Modular Wind Turbine Rotor Blades and Methods of Assembling Same," which is incorporated herein by reference in its entirety, have a modular panel configuration. Thus, the various blade components of the modular blade can be constructed of varying materials based on the function and/or location of the blade component. More specifically, the blade segments may be constructed of a thermoplastic material.

Regardless of the manufacturing method, repair of wind turbine rotor blades is inevitable due to defects or damage that occurs during the manufacturing process, shipping and handling, installation, and/or wind turbine operation. For example, the rotor blade structures are typically lightweight for cost and performance purposes and are often inadvertently damaged due to handling and/or operation. In addition, many rotor blades, such as the thermoplastic modular rotor blades described above, may experience creep and/or deformation due to repeated load and/or temperature cycles. It is therefore necessary to repair the rotor blades when such defects occur.

Conventional repair techniques for rotor blades include grinding out defective regions and re-laminating the defective area, mostly by hand. The repairs must be allowed to cure before operation of the wind turbine may resume, which in some cases can take several hours due to repair and/or cure time.

Thus, the art is continuously seeking new and improved rotor blades and related repair methods that address the aforementioned issues.

BRIEF DESCRIPTION OF THE INVENTION

Aspects and advantages of the invention will be set forth in part in the following description, or may be obvious from the description, or may be learned through practice of the invention.

In one aspect, the present disclosure is directed a method for repairing a rotor blade of a wind turbine. More specifically, in certain embodiments, the rotor blade may be constructed, at least in part, of a thermoplastic material reinforced with at least one fiber material. In addition, the fiber material may include at least one of glass fibers, carbon fibers, polymer fibers, ceramic fibers, nanofibers, metal fibers, or any other suitable fibers or fiber bundles. Thus, the method includes identifying at least one defect on the rotor blade. For example, in certain embodiments, the defect(s) as described herein may include a crack, creep, void, hole, distortion, deformation, scratch, or any other blade defect. The method also includes applying at least one of heat, pressure, or one or more chemicals to the defect(s) for a predetermined time period until the defect is repaired.

In one embodiment, the step of applying heat, pressure, and/or one or more chemicals to the defect(s) may include utilizing at least one of welding, a heat lamp, heated air, an extended light source, a radiation source, a heated blanket, or another other suitable heat, pressure, or chemical source. More specifically, in certain embodiments, any suitable type of welding process may be utilized, including but not limited to hot gas welding, speed tip welding, extrusion welding, high frequency welding, induction welding, injection welding, ultrasonic welding, friction welding, contact welding, laser welding, chemical welding, or any other suitable types of welding processes.

In another embodiment, the method may also include arranging at least one layer of thermoplastic material with the defect. Thus, in such embodiments, the step of applying heat and/or pressure to the defect may include welding the layer of thermoplastic material to the defect of the rotor blade. More specifically, in certain embodiments, the layer of thermoplastic material may include a patch, plug, sheet, or similar that covers or fills the defect when welded thereto. In additional embodiments, the method may further include controlling a welding temperature of the welding step such that the welding temperature is above a melting point of the layer of thermoplastic material but below a melting temperature of a core or foam material in the rotor blade.

In further embodiments, the method may include reinforcing at least a portion of the layer of thermoplastic material with at least one fiber material. In additional embodiments, the method may further include forming the layer of thermoplastic material to have an overall thickness such that the layer remains flexible so as to conform to a contour of the rotor blade at the defect. In yet another embodiment, the method may also include shaping the layer of thermoplastic material using a temperature-resistant non-stick surface. Thus, the addition of the layer is configured to maintain the aerodynamic properties of the parent blade material.

In addition, the method may include shaping the layer of thermoplastic material, at least in part, using an insulative material. In such embodiments, an operator can easily hold the layer over the defect, which can allow slower cooling for better bond properties. Alternatively, the method may include forming the layer of thermoplastic material, at least in part, using a conductive material to allow heating through the material.

In another aspect, the present disclosure is directed to a method for repairing a rotor blade of a wind turbine. More specifically, in certain embodiments, the rotor blade may be constructed, at least in part, of a thermoset material. Thus, the method includes identifying at least one defect on the rotor blade. The method also includes bonding a base layer of thermoplastic material to the defect of the rotor blade so as to form a repair location. Further, the method includes arranging an additional layer of thermoplastic material at the repair location. In addition, the method includes welding the additional layer of thermoplastic material to the repair location.

In one embodiment, the step of bonding the base layer of thermoplastic material to the defect of the rotor blade so as to form the repair location may further include securing the base layer of thermoplastic material to the rotor blade via at least one of an adhesive or one or more mechanical fasteners.

In additional embodiments, the step of welding the additional layer of thermoplastic material to the repair location may further include laser welding, chemical welding, or any other suitable type of welding.

In another embodiment, the method may include reinforcing at least a portion of the thermoplastic material of at least one of the rotor blade or the at least one layer with at least one fiber material. More specifically, as mentioned, the fiber material may include at least one of glass fibers, carbon fibers, polymer fibers, ceramic fibers, nanofibers, metal fibers, or any other suitable fibers or fiber bundles.

In another embodiment, the method may further include controlling a welding temperature of the welding step such that the welding temperature is above a melting point of the additional layer of thermoplastic material but below a melting temperature of a core or foam material in the rotor blade.

In yet another aspect, the present disclosure is directed to a repair kit for a rotor blade of a wind turbine. The repair kit includes at least one layer of thermoplastic material configured to cover at least one defect of the rotor blade. Further, an area of the rotor blade containing the defect may be constructed, at least in part, of a thermoplastic material or a thermoset material. The repair kit may also include a repair apparatus configured to apply at least one of heat, pressure, and/or one or more chemicals to the at least one layer of thermoplastic material so as to repair the defect.

In one embodiment, the repair apparatus may include at least one of a welding apparatus, a radiation source, a heat lamp, a pump, a light source, a clamp, a heated blanket, or any other suitable heat source. It should be understood that the repair kit may be further configured according with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a rotor blade of a wind turbine according to the present disclosure;

FIG. 3 illustrates an exploded view of the modular rotor blade of FIG. 2;

FIG. 4 illustrates a cross-sectional view of one embodiment of a leading edge segment of a modular rotor blade according to the present disclosure;

FIG. 5 illustrates a cross-sectional view of one embodiment of a trailing edge segment of a modular rotor blade according to the present disclosure;

FIG. 6 illustrates a cross-sectional view of the modular rotor blade of FIG. 2 according to the present disclosure along line 6-6;

FIG. 7 illustrates a cross-sectional view of the modular rotor blade of FIG. 2 according to the present disclosure along line 7-7;

FIG. 8 illustrates a flow diagram of one embodiment of a method for repairing a rotor blade of a wind turbine according to the present disclosure;

FIG. 9 illustrates a perspective view of one embodiment of a rotor blade of a wind turbine having a defect on an outer surface thereof according to the present disclosure;

FIG. 10 illustrates a cross-sectional view of one embodiment of a rotor blade of a wind turbine having a defect on an inner surface thereof according to the present disclosure;

FIG. 11 illustrates a schematic diagram of one embodiment of a repair apparatus of a repair kit for repairing a defect of a rotor blade of a wind turbine according to the present disclosure;

FIG. 12 illustrates a cross-sectional view of one embodiment of a rotor blade having a repaired defect on an outer surface thereof according to the present disclosure;

FIG. 13 illustrates a flow diagram of another embodiment of a method for repairing a rotor blade of a wind turbine according to the present disclosure; and FIG. 14 illustrates a perspective view of one embodiment of a thermoset rotor blade of a wind turbine having a defect on an outer surface thereof according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for repairing wind turbine rotor blades by applying heat, pressure, and/or one or more chemicals (e.g. chemical solvent(s)) to the defective area. More specifically, in one embodiment, the method includes identifying at least one defect on the rotor blade. For example, in certain embodiments, the defect(s) as described herein may include a crack, creep, void, hole, distortion, deformation, scratch, or any other blade defect. Further, it should be understood that the defect may include a manufacturing defect as well as a defect or damage that occurs due to handling, shipping, installing, and operation of the wind turbine (e.g. due to fatigue and/or extreme loading, erosion, or similar). The method also includes applying at least one of heat (e.g. via welding) pressure, and/or one or more chemicals to the defect(s) for a predetermined time period until the defect is repaired. For example, in one embodiment, if the rotor blade may be constructed of a thermoplastic material and the defect may be a manufacturing defect. Thus, in such an embodiment, the method may include annealing the thermoplastic blade segment containing the defect by applying heat thereto so as to reverse the effects of creep and/or deformation.

More specifically, in further embodiments, the method may include arranging at least one layer of thermoplastic material (e.g. additional resin, a sheet, patch, plug, or scarf) with the defect and welding (e.g. via laser or chemical welding) the material over the defect to form the required structural bond overlap between the parent rotor blade material and the new repair material. Further, in particular embodiments, the layer(s) of thermoplastic material may have lower glass content or no glass content so as to provide sufficient thermoplastic flow for a sufficient bond.

Thus, the present disclosure provides many advantages not present in the prior art. For example, where the rotor blade is formed from a thermoplastic material, the method of the present disclosure reduces repair time for rotor blades as the defect can be heated directly to anneal the resin so as to repair the issue. In further embodiments, where additional thermoplastic repair layer(s) are used, the layer(s) can be directly welded to the damaged rotor blade. Further, the thermoplastic repair materials can be shaped by heat to match the blade contour. In addition, the welded connection can form an effective structural bond. Moreover, repairs can be more easily performed in colder temperatures. For example, in certain embodiments, chemical welding may eliminate the need for applied heat sources, even in cold weather.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Referring now to FIGS. 2 and 3, various views of a rotor blade 16 according to the present disclosure are illustrated. As shown, the illustrated rotor blade 16 has a segmented or modular configuration. It should also be understood that the rotor blade 16 may include any other suitable configuration now known or later developed in the art. As shown, the modular rotor blade 16 includes a main blade structure 15 constructed, at least in part, from a thermoset and/or a thermoplastic material and at least one blade segment 21 configured with the main blade structure 15. More specifically, as shown, the rotor blade 16 includes a plurality of blade segments 21. The blade segment(s) 21 may also be constructed, at least in part, from a thermoset and/or a thermoplastic material. In addition, as mentioned, the thermoplastic and/or the thermoset material as described herein may optionally be reinforced with a fiber material, including but not limited to glass fibers, carbon fibers, polymer fibers, ceramic fibers, nanofibers, metal fibers, or similar or combinations thereof. In addition, the direction of the fibers may include biaxial, unidirectional, triaxial, or any other another suitable direction and/or combinations thereof. Further, the fiber content may vary depending on the stiffness required in the corresponding blade component, the region or location of the blade component in the rotor blade 16, and/or the desired weldability of the component.

More specifically, as shown, the main blade structure 15 may include any one of or a combination of the following: a pre-formed blade root section 20, a pre-formed blade tip section 22, one or more one or more continuous spar caps 48, 50, 51, 53, one or more shear webs 35 (FIGS. 6-7), an additional structural component 52 secured to the blade root section 20, and/or any other suitable structural component of the rotor blade 16. Further, the blade root section 20 is configured to be mounted or otherwise secured to the rotor 18 (FIG. 1). In addition, as shown in FIG. 2, the rotor blade 16 defines a span 23 that is equal to the total length between the blade root section 20 and the blade tip section 22. As shown in FIGS. 2 and 6, the rotor blade 16 also defines a chord 25 that is equal to the total length between a leading edge 40 of the rotor blade 16 and a trailing edge 42 of the rotor blade 16. As is generally understood, the chord 25 may generally vary in length with respect to the span 23 as the rotor blade 16 extends from the blade root section 20 to the blade tip section 22.

In specific embodiments, as shown in FIGS. 2-3 and 6-7, the main blade structure 15 may include the blade root section 20 with one or more longitudinally extending spar caps 48, 50 infused therewith. For example, the blade root section 20 52 may be configured according to U.S. application Ser. No. 14/753,155 filed Jun. 29, 2015 entitled "Blade Root Section for a Modular Rotor Blade and Method of Manufacturing Same" which is incorporated herein by reference in its entirety. Similarly, the main blade structure 15 may include the blade tip section 22 with one or more longitudinally extending spar caps 51, 53 infused therewith. More specifically, as shown, the spar caps 48, 50, 51, 53 may be configured to be engaged against opposing inner surfaces of the blade segments 21 of the rotor blade 16. Further, the blade root spar caps 48, 50 may be configured to align with the blade tip spar caps 51, 53. Thus, the spar caps 48, 50, 51, 53 may generally be designed to control the bending stresses and/or other loads acting on the rotor blade 16 in a generally span-wise direction (a direction parallel to the span 23 of the rotor blade 16) during operation of a wind turbine 10. In addition, the spar caps 48, 50, 51, 53 may be designed to withstand the span-wise compression occurring during operation of the wind turbine 10. Further, the spar cap(s) 48, 50, 51, 53 may be configured to extend from the blade root section 20 to the blade tip section 22 or a portion thereof. Thus, in certain embodiments, the blade root section 20 and the blade tip section 22 may be joined together via their respective spar caps 48, 50, 51, 53.

In addition, the spar caps 48, 50, 51, 53 may be constructed of any suitable materials, e.g. a thermoplastic or thermoset material or combinations thereof. Further, the spar caps 48, 50, 51, 53 may be pultruded from thermoplastic or thermoset resins. As used herein, the terms "pultruded," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section. Thus, the pre-cured composite materials may include pultrusions constructed of reinforced thermoset or thermoplastic materials. Further, the spar caps 48, 50, 51, 53 may be formed of the same pre-cured composites or different pre-cured composites. In addition, the pultruded components may be produced from rovings, which generally encompass long and narrow bundles of fibers that are not combined until joined by a cured resin.

In addition, as shown in FIGS. 6-7, the main blade structure 15 may include one or more shear webs 35 configured between the one or more spar caps 48, 50, 51, 53. More particularly, the shear web(s) 35 may be configured to increase the rigidity in the blade root section 20 and/or the blade tip section 22. Further, the shear web(s) 35 may be configured to close out the blade root section 20. In addition, as shown in FIGS. 2 and 3, the main blade structure 15 may also include an additional structural component 52 secured to the blade root section 20 and extending in a generally span-wise direction. For example, the structural component 52 may be configured according to U.S. application Ser. No. 14/753,150 filed Jun. 29, 2015 entitled "Structural Component for a Modular Rotor Blade" which is incorporated herein by reference in its entirety. More specifically, the structural component 52 may extend any suitable distance between the blade root section 20 and the blade tip section 22. Thus, the structural component 52 is configured to provide additional structural support for the rotor blade 16 as well as an optional mounting structure for the various blade segments 21 as described herein. For example, in certain embodiments, the structural component 52 may be secured to the blade root section 20 and may extend a predetermined span-wise distance such that the leading and/or trailing edge segments 24, 26 can be mounted thereto.

The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Referring particularly to FIGS. 2-7, any number of blade segments 21 having any suitable size and/or shape may be generally arranged between the blade root section 20 and the blade tip section 22 along a longitudinal axis 27 in a generally span-wise direction. Thus, the blade segments 21 generally serve as the outer casing/covering of the rotor blade 16 and may define a substantially aerodynamic profile, such as by defining a symmetrical or cambered airfoil-shaped cross-section. In additional embodiments, it should be understood that the blade segment portion of the blade 16 may include any combination of the segments described herein and are not limited to the embodiment as depicted. In addition, the blade segments 21 may be constructed of any suitable materials, including but not limited to a thermoset material or a thermoplastic material optionally reinforced with one or more fiber materials. More specifically, in certain embodiments, the blade segments 21 may include any one of or combination of the following blade segments: pressure and/or suction side segments 44, 46, (FIGS. 2 and 3), leading and/or trailing edge segments 24, 26 (FIGS. 2-6), a non-jointed segment, a single-jointed segment, a multi-jointed blade segment, a J-shaped blade segment, or similar.

More specifically, as shown in FIG. 4, the leading edge segments 24 may have a forward pressure side surface 28 and a forward suction side surface 30. Similarly, as shown in FIG. 5, each of the trailing edge segments 26 may have an aft pressure side surface 32 and an aft suction side surface 34. Thus, the forward pressure side surface 28 of the leading edge segment 24 and the aft pressure side surface 32 of the trailing edge segment 26 generally define a pressure side surface of the rotor blade 16. Similarly, the forward suction side surface 30 of the leading edge segment 24 and the aft suction side surface 34 of the trailing edge segment 26 generally define a suction side surface of the rotor blade 16. In addition, as particularly shown in FIG. 6, the leading edge segment(s) 24 and the trailing edge segment(s) 26 may be joined at a pressure side seam 36 and a suction side seam 38. For example, the blade segments 24, 26 may be configured to overlap at the pressure side seam 36 and/or the suction side seam 38. Further, as shown in FIG. 2, adjacent blade segments 24, 26 may be configured to overlap at a seam 54. Thus, where the blade segments are constructed of a thermoplastic material, adjacent blade segments 21 can be welded together along the seams 36, 38, 54. Alternatively, in certain embodiments, the various segments of the rotor blade 16 may be secured together via an adhesive 56 (or mechanical fasteners) configured between the overlapping leading and trailing edge segments 24, 26 and/or the overlapping adjacent leading or trailing edge segments 24, 26.

Referring now to FIGS. 8-11, various embodiments of repairing a rotor blade, e.g. the modular rotor blade 16 as described herein, are illustrated. For example, as shown in FIG. 8, a flow diagram of one embodiment of a method 100 for repairing a rotor blade 16 of a wind turbine 10 according to the present disclosure is illustrated. As shown at 102, the method 100 includes identifying at least one defect 58 on the rotor blade 16. For example, as shown in FIGS. 9 and 10, the defect 58 may be on an outer surface 29 of the rotor 16 or within the internal cavity 37 of the rotor blade 16. In addition, it should be understood that the defect(s) 58 may be located at any location on the rotor blade 16. Further, in certain embodiments, the defect(s) 58 as described herein may include a crack, creep, void, hole, distortion, deformation, scratch, or any other blade defect. Moreover, as mentioned, the rotor blade 16 may be constructed, at least in part, of a thermoplastic material optionally reinforced with at least one fiber material. Thus, as shown at 104, the method 100 includes applying heat, pressure, and/or one or more chemicals to the defect(s) 58 for a predetermined time period until the defect 58 is repaired. Accordingly, the thermoplastic resin of the rotor blade 16 may be effectively annealed at the location of the defect 58, thereby allowing the resin to fill in the defect(s) 58.

In further embodiments, for example, where the rotor blade 16 has a modular configuration with one or more blade segments 21, the defective blade segment 21 may be removed from the rotor blade. In addition, the method 100 may include coating the defective area of the blade 16 with a thermoplastic resin to ensure the weld to the replacement panel has enough thermoplastic resin to prevent creep and/or deformation of the new weld. Further, it should be understood that a similar procedure may be performed for a non-modular rotor blade 16.

In certain embodiments, the step of applying heat, pressure, and/or chemicals to the defect(s) 58 may include utilizing at least one of welding (e.g. laser or chemical welding), a heat lamp, a radiation source, heated air, an extended light source, a heated blanket, a clamp, or another other suitable heat or pressure source. For example, in one embodiment, when heat and/or pressure are applied to the defect 58, the defect 58 is repaired by annealing the thermoplastic resin allowing the resin to fill in the defect 58. It should also be understood that pressure may be applied to the defect by hand.

In additional embodiments, a second resin may also be applied to the defect 58 to assist in the repair thereof. For example, in such embodiments, the method 100 may include arranging at least one layer of thermoplastic material with the defect 58, i.e. so as to cover the defect 58. Thus, in such embodiments, the method 100 may include welding the layer 62 of thermoplastic material to the defect 58 of the rotor blade 16. More specifically, as shown in FIG. 11, a schematic diagram of a repair kit 60 for a rotor blade 16 of a wind turbine 10 is illustrated. As shown, the repair kit 60 may include at least one layer 62 of thermoplastic material configured to cover one or more defects 58 of the rotor blade 16. Further, as mentioned, an area of the rotor blade 16 containing the defect 58 may be constructed, at least in part, of a thermoplastic material reinforced with at least one fiber material. Thus, the repair kit 60 may also include a repair apparatus 64 configured to apply heat, pressure, and/or one or more chemicals to the layer(s) 62 of thermoplastic material when the layer(s) 62 are arranged with or cover the defect 58 so as to repair the defect 58. For example, in certain embodiments, the repair apparatus 64 may include at least one of a welding apparatus, a radiation source, a heat lamp, a pump, a light source, a clamp, a heated blanket, or any other suitable heat source. It should be understood that the repair kit 60 may be further configured according with any of the additional features as described herein.

In addition, as shown in FIG. 11, the method 100 may further include controlling (e.g. via controller 65) a welding temperature of the welding process such that the welding temperature is above a melting point of the layer(s) 62 of thermoplastic material but below a melting temperature of a core material (e.g. foam material) in the rotor blade 16. More specifically, depending on the resin matrix and foam chemistry of the rotor blade 16, the melting point of each may be relatively close to each other. In such embodiments, the method 100 may include tailoring the core material to have a higher melting point versus thermoplastic resin matrix so as to avoid such an issue.

Still referring to FIG. 11, the method 100 may further include reinforcing at least a portion of the layer(s) 62 with at least one fiber reinforcement material 63. For example, in certain embodiments, the fiber reinforcement material 63 may include at least one of glass fibers, carbon fibers, polymer fibers, ceramic fibers, nanofibers, metal fibers, or any other suitable fibers or fiber bundles.

Referring now to FIG. 12, the method 100 may also include forming the layer(s) 62 of thermoplastic material with an overall thickness 67 such that the layer 62 remains flexible so as to conform to a contour of the rotor blade 16 at the defect 58. In addition, the method 100 may include forming the layer(s) 62 thermoplastic material with a temperature-resistant non-stick surface that can conform to the blade shape when heat is applied to the weld area.

In additional embodiments, the method 100 may include shaping the layer(s) 62 of thermoplastic material, at least in part, using an insulative material. The insulative material may include any suitable material including but not limited to wood, rubber, silicone, or similar. In such embodiments, an operator can easily hold the layer 62 over the defect 58, which can allow slower cooling for better bond properties. Alternatively, the method 100 may include shaping the layer(s) 62 of thermoplastic material, at least in part, using a conductive material so as to allow heating through the material. The conductive material may include any suitable material including but not limited to metal, a metal alloy, a conductive non-metal, or similar.

Referring now to FIG. 13, a flow diagram of another embodiment of a method 200 for repairing a rotor blade 16 of a wind turbine 10 according to the present disclosure is illustrated. As shown at 202, the method 200 identifying at least one defect 58 on the rotor blade 16. The rotor blade 16 may be constructed, at least in part, of a thermoset material. Thus, as shown at 204, the method 200 may also include bonding a base layer 66 of thermoplastic material to the defect 58 (as indicated by the dotted lines) of the rotor blade 16 so as to form a repair location 68, e.g. as shown in FIG. 14. More specifically, for a thermoset rotor blade (or hybrid thermoset-thermoplastic rotor blade), the repair method may include cutting or grounding out the area containing the defect. In addition, for certain embodiments, the defective area may be coated with a thermoplastic resin and/or one or more wet thermoplastic layers or plies. In addition, as shown, the base layer 66 may include a flange or any other suitable thermoplastic surface. Further, as shown at 206, the method 200 includes arranging an additional layer 70 of thermoplastic material at the repair location 68. In addition, as shown at 208, the method 200 includes welding the additional layer 70 of thermoplastic material to the repair location 68. More specifically, after the thermoplastic coating and/or plies cure or polymerize, the repair method 200 may include welding at least one layer of thermoplastic material (e.g. additional resin, a sheet, patch, plug, or scarf) the defective area.

In one embodiment, the step of bonding the base layer 66 of thermoplastic material to the defect 58 of the rotor blade 16 so as to form the repair location 68 may further include securing the base layer 66 of thermoplastic material to the rotor blade 16 via an adhesive, one or more mechanical fasteners, or any other suitable attachment means. In another embodiment, the method 200 may include reinforcing at least a portion of the thermoplastic material of the rotor blade 16, the additional layer 70 of thermoplastic material, or both, with at least one fiber material. More specifically, as mentioned, the fiber material may include at least one of glass fibers, carbon fibers, polymer fibers, ceramic fibers, nanofibers, metal fibers, or any other suitable fibers or fiber bundles.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for repairing a rotor blade of a wind turbine, the method comprising:
   identifying at least one defect on one or more surfaces of the rotor blade, the one or more outer surfaces of the rotor blade constructed, at least in part, of a thermoplastic material reinforced with at least one fiber material;
   shaping at least one layer of thermoplastic material using at least one of a temperature-resistant non-stick surface, an insulative material, or a conductive material;
   arranging the at least one layer of thermoplastic material with the defect; and,
   welding the at least one layer of thermoplastic material to the thermoplastic material of the one or more surfaces of the rotor blade at the at least one defect for a predetermined time period.

2. The method of claim 1, further comprising controlling a welding temperature of the welding step such that the welding temperature is above a melting point of the at least one layer of thermoplastic material but below a melting temperature of a core material of the rotor blade.

3. The method of claim 1, further comprising reinforcing at least a portion of the at least one layer of thermoplastic material with at least one fiber material.

4. The method of claim 1, further comprising forming the at least one layer of thermoplastic material with an overall thickness such that the layer remains flexible so as to conform to a contour of the rotor blade at the defect.

5. The method of claim 1, wherein the at least one defect may include a crack, creep, a void, a hole, a distortion, a deformation, or a scratch.

6. A method for repairing a rotor blade of a wind turbine, the method comprising:
   identifying at least one defect on the rotor blade, the rotor blade constructed, at least in part, of a thermoset material; and,
   securing a base layer of thermoplastic material to the defect of the rotor blade via at least one of an adhesive or one or more mechanical fasteners so as to completely cover the defect;
   arranging an additional layer of thermoplastic material atop the base layer thermoplastic material that also completely covers the defect; and,
   welding the additional layer of thermoplastic material to the base layer of thermoplastic material.

7. The method of claim 6, wherein welding the additional layer of thermoplastic material to the base layer of thermoplastic material at the repair location further comprises at least one of laser welding or chemical welding.

8. The method of claim 6, further comprising reinforcing at least a portion of the base layer of thermoplastic material, the additional layer of thermoplastic material, and/or the rotor blade with at least one fiber material.

9. The method of claim 8, wherein the fiber material comprises at least one of glass fibers, carbon fibers, polymer fibers, ceramic fibers, nanofibers, or metal fibers.

10. The method of claim 6, wherein welding the additional layer of thermoplastic material to the base layer of thermoplastic material at the repair location further comprises controlling a welding temperature of the welding step such that the welding temperature is above a melting point of the base layer of thermoplastic material but below a melting temperature of a core material of the rotor blade.

11. The method of claim 6, further comprising controlling a welding temperature of the welding step such that the welding temperature is above a melting point of the additional layer of thermoplastic material but below a melting temperature of a core material in the rotor blade.

* * * * *